United States Patent [19]
Clement

[11] 3,836,936
[45] Sept. 17, 1974

[54] ELECTRIFIED DUCT AND FITTINGS THEREFOR

[75] Inventor: Ralph C. Clement, Bellefontaine, Ohio

[73] Assignee: I-T-E Imperial Corporation, Spring House, Pa.

[22] Filed: Nov. 24, 1972

[21] Appl. No.: 308,975

[52] U.S. Cl..................... 339/21 R, 191/33, 174/48
[51] Int. Cl............................................. H01r 9/00
[58] Field of Search......... 339/20, 21 R, 21 S, 22 T, 339/23, 24, 14 R; 191/33, 35, 40; 104/89, 93, 95; 174/48

[56] References Cited
UNITED STATES PATENTS

| | | | |
|---|---|---|---|
| 2,969,438 | 1/1961 | Herrmann et al. | 191/40 X |
| 2,977,566 | 3/1961 | Neumann et al. | 339/20 X |
| 3,239,795 | 3/1966 | Verrone | 339/91 |
| 3,246,074 | 4/1966 | Neumann et al. | 174/48 |
| 3,683,312 | 8/1972 | Routh et al. | 339/21 R |

Primary Examiner—Bobby R. Gay
Assistant Examiner—Robert A. Hafer
Attorney, Agent, or Firm—Ostrolenk Faber Gerb & Soffen

[57] ABSTRACT

A stylized electrical duct is formed by inserting a conventional duct with a formed sheet metal casing inside of an extruded housing. Internal formations of the extruded housing are utilized to maintain polarity between duct section and to properly position the housing and casing relative to each other. External formations of the extruded housing are used to mount and maintain polarity for appliances, and to mount a strip providing a support for a ceiling which engages the latter from below.

12 Claims, 13 Drawing Figures

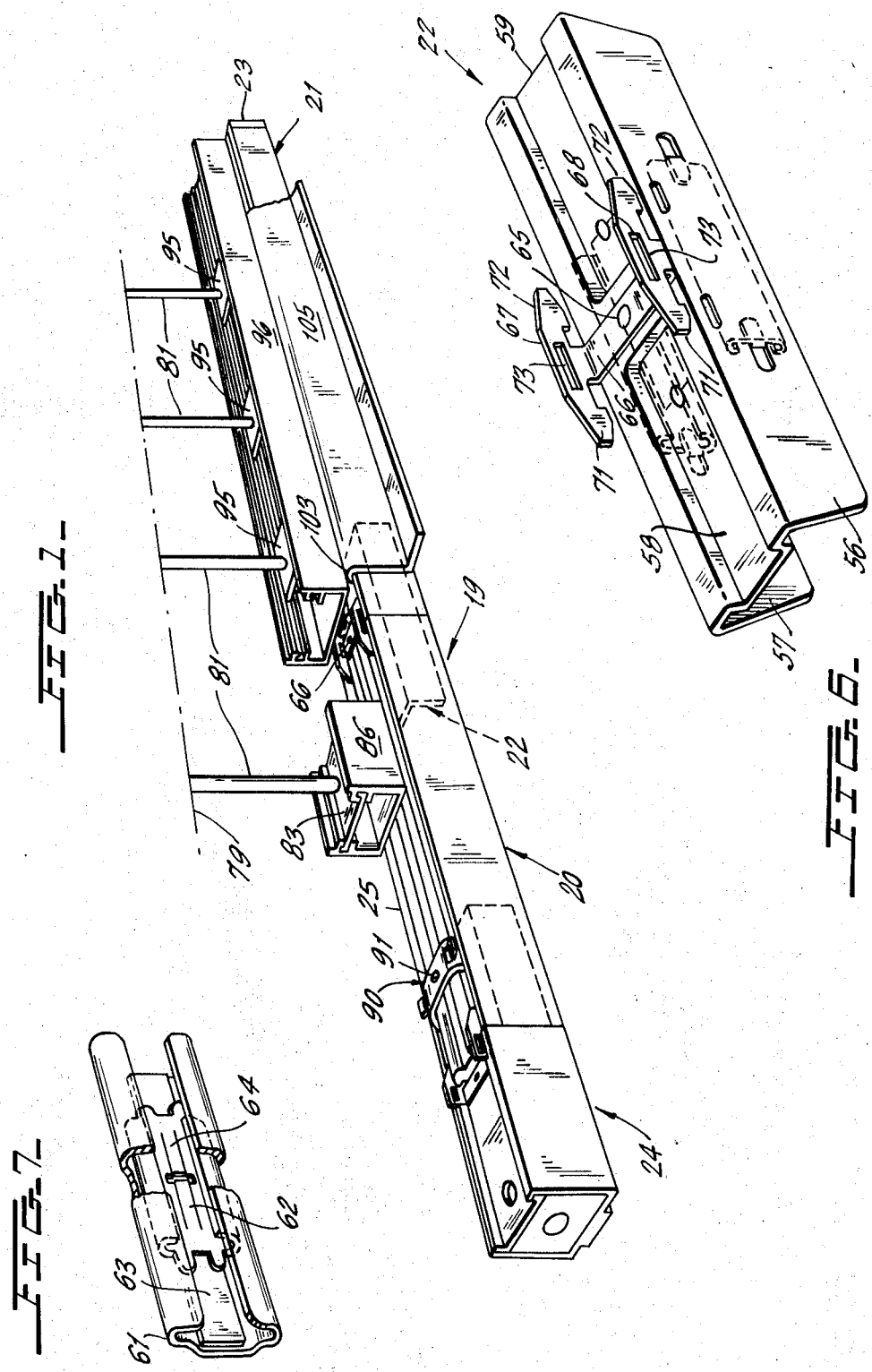

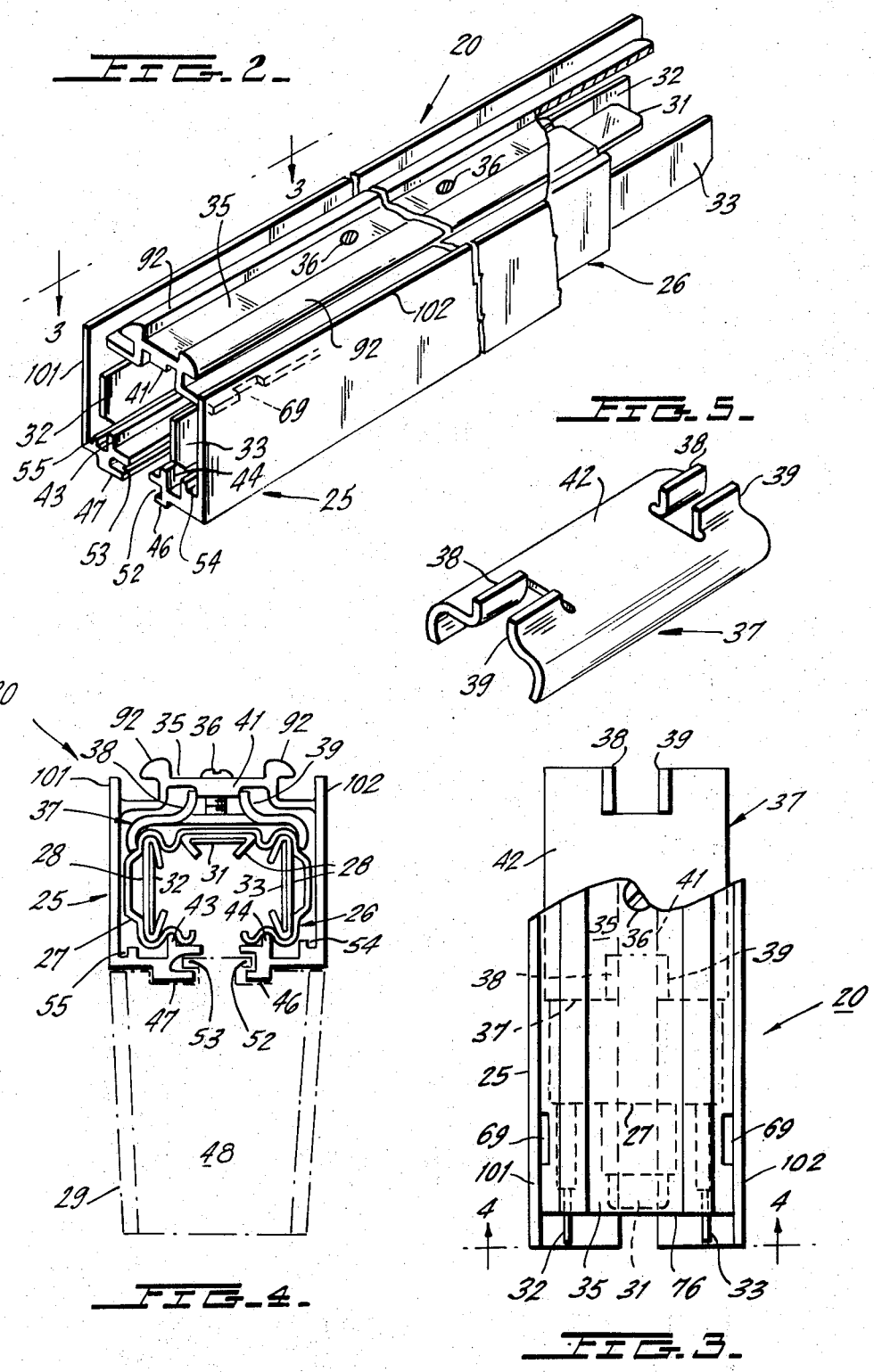

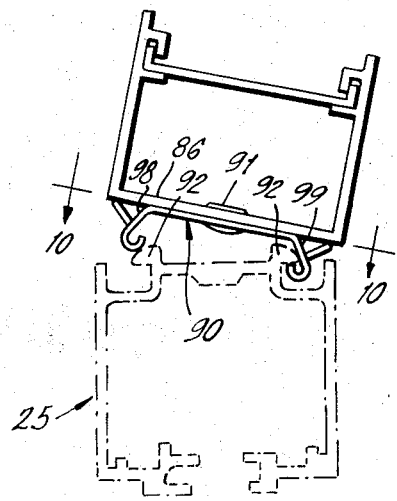
FIG. 9.
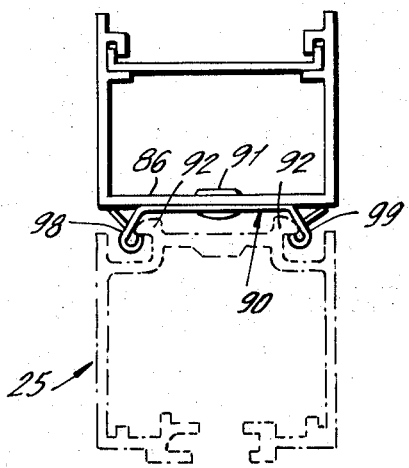
FIG. 8.
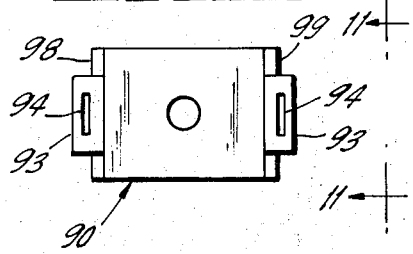
FIG. 10.
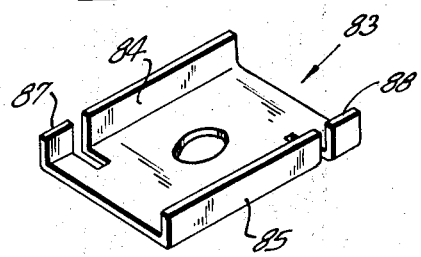
FIG. 12.
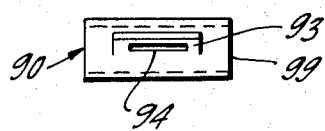
FIG. 11.
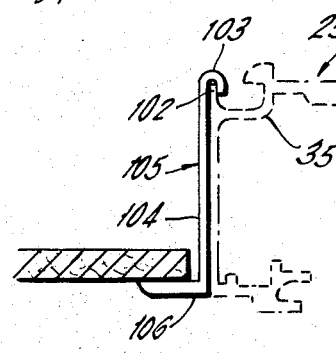
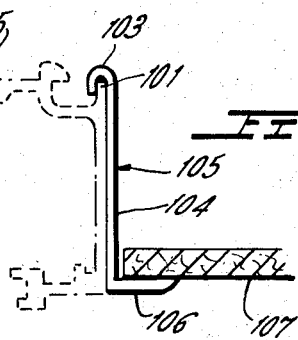
FIG. 13.

3,836,936

ELECTRIFIED DUCT AND FITTINGS THEREFOR

This invention relates to electric ducts in general and more particularly relates to the utilization of standard lighting duct in combination with an extruded housing to form a stylized duct structure that may be surface mounted or recessed.

The type of lighting duct illustrated in the W. H. Frank, U.S. Pat. No. 2,088,106 issued July 27, 1937, for a Method of Making Bus Duct includes a plurality of flat conductors disposed within a generally rectangular elongated housing constructed by forming or bending sheet steel. The housing is provided with a longitudinal access slot for the insertion of bus bar engaging accessory elements into the housing. This type of duct has been manufactured for more than thirty years and because of economy and reliability continues to be manufactured. However, in recent years, the appearance of this type of duct has failed to meet appearance standards set for some new construction.

Thus, in accordance with the instant invention, a stylized duct is provided by utilizing an extruded generally rectangular housing within which there is mounted the reliable, time-tested ducts with a casing formed of bent sheet steel. The extruded housing is provided with a longitudinal slot aligned with the longitudinal slot of the duct casing and formations are provided along the extruded housing slots for mechanical securement of appliances. As will hereinafter be seen, the extruded housing is provided with internal ribs for positioning the duct casing, and pressure plate means are interposed between the extruded housing and duct casing to prevent relative movement therebetween. The extruded housing is also provided with internal formations that cooperate with duct section cover to maintain polarization between adjacent duct sections.

The outside of the extruded housing is provided with hook-engageable formations that support and position hanger strips suitable for support of ceiling tiles or other dropped ceiling material. When the stylized duct is recessed so as to be flush with the ceiling.

Accordingly, a primary object of the instant invention is to provide a novel construction for a reliable stylized electrical duct that is economical to produce.

Another object is to provide a stylized duct of this type which utilizes an extruded housing to enclose lighting ducts having a conventional formed sheet metal housing.

Still another object is to provide a novel construction for stylized ducts having means for maintaining polarization between adjacent duct sections and between the ducts and appliances mounted thereto.

A further object is to provide stylized ducts with novel means for supporting a dropped ceiling.

A still further object is to provide stylized duct that is readily assembled and disassembled.

These objects as well as other objects of this invention will become readily apparent after reading the following description of the accompanying drawings in which:

FIG. 1 is a perspective illustrating two lengths of stylized duct connected together to form a short duct run, with this figure also showing different types of support means mounted to the duct sections.

FIG. 2 is a perspective of a stylized duct section constructed in accordance with teachings of the instant invention, with portions of the external housing broken away to more clearly reveal internal elements.

FIG. 3 is a fragmentary plan view looking in the direction of arrows 3—3 of FIG. 2.

FIG. 4 is an end view of the stylized duct, looking in the direction of arrows 4—4 of FIG. 3.

FIG. 5 is a perspective of a pressure plate for restraining main portions of the duct against relative movement.

FIG. 6 is a perspective of the coupler that electrically and mechanically connects the two stylized duct sections of FIG. 1.

FIG. 7 is a perspective of a contact assembly for the coupler of FIG. 6.

FIG. 8 is an end view of a hanger assembly.

FIG. 9 is an end view of the snap clamp of the hanger assembly of FIG. 8. In FIG. 9 the clamp is shown partially engaged with the extruded housing of the stylized duct.

FIG. 10 is a plan view of the snap clamp, looking in the direction of arrows 10—10 of FIG. 9.

FIG. 11 is a side elevation of the snap clamp, looking in the direction of arrows 11—11 of FIG. 10.

FIG. 12 is a perspective of the hanging plate of the assembly of FIG. 8.

FIG. 13 is an end view illustrating ceiling hanger strips mounted to the stylized duct.

Now referring to the figures. Duct run 19 of FIG. 1 is constructed of two identical stylized duct units 20, 21 electrically and mechanically connected end to end in axial alignment by coupler 22 of FIG. 6. The right end of duct run 19 is closed by insulating cap 23 retained by spring means (not shown), and the left end of duct run 19 terminates in feed-in device 24 through which electrical power is connected to duct run 19.

Stylized duct unit 20 is constructed of extruded stylized housing 25 wherein electrified duct section 26 is disposed. The latter is a standard unit length of combination trolley-lighting duct, generally of the construction described in the aforesaid U.S. Pat. No. 2,088,106, including formed sheet metal casing 27 wherein three bus bars 31–33 are disposed in insulating relationship being partially wrapped in individual insulating sheets 28 of modified C-shaped cross-section. Bus bars 31–33 extend substantially beyond both ends of casing 27 and terminate within housing 25 near the ends thereof. Housing 25 and casing 27 are generally rectangular in cross-section, and each is provided with a longitudinal opening or slot in its lower wall extending the full length thereof for the mounting of appliances, such as tap-off unit 29 shown in phantom in FIG. 4.

The operative relationship between stylized housing section 25 and duct unit 26 is maintained by a pair of screws 36 engaging a pair of clamping plates 37 (FIG. 5). Each clamping plate 37 is an inverted U-shaped element having short arms whose free ends engage casing 27 just above the bulging sidewalls thereof. Each end of pressure plate is formed with a pair of spaced ears 38, 39, positioned on opposite sides of central rib 41 formed integrally with stylized housing 25 on the interior wall of its web 35. Each screw 36 passes through a threaded aperture in rib 41 and bears against the central portion 42 of the pressure plate web, driving pressure plate 37 downward and thereby forcing duct section 27 downward against internal locating ribs 43, 44 of housing 25 disposed adjacent the longitudinal access slot therein. Locating ribs 43, 44 extend into external locating grooves in casing 27 positioned near the longitudinal access slot thereof.

External longitudinal lips 46, 47 positioned adjacent the longitudinal slot of housing section 25 are assymmetrical and cooperate with complementary formations of tap-off unit housing 48 (FIG. 4) to maintain proper polarization through tap-off unit 29 between an electrical load and stylized duct 20. Depressions 52, 53 adjacent the respective short and long polarizing lips 46, 47 serves to facilitate mechanical securement of tap-off unit 29 as more fully described in U.S. Pat. application Ser. No. 333,024 filed Feb. 16, 1973. COrrect polarity between adjacent duct sections 20, 21 is maintained by the positioning of notches 54, 55 along the lower interior portions of the sidewalls for stylized housing 25. More particularly, notches 54, 55 are positioned to receive the lower ends of the respective short and long side walls 56, 57 of U-shaped support member 59 of coupler 22. Notch 54 is positioned to reject long sidewall 57.

In a manner well knwon to the art, the central portions of arms 56, 57 and the central portion of web 58 joining arms 56, 57 are each provided with a contact assembly, essentially of the same construction as contact assembly 60 of FIG. 7. Briefly, contact assembly 60 includes formed insulating sheet 61 whose edges overlap the edges of C-shaped contact 62 holding the latter in central position by means of interlocking formations in the region 63, 64. The face of contact element 62 that does not face insulator 61 is exposed and is engaged by the faces of axially aligned bus bars extending in opposite directions from adjacent duct units 20, 21, so that contact 62 forms an electrical bridge therebetween.

Rivet 65 secures spring clip retainer 66 to the exterior surface of web 58 at the center thereof. Each end of retainer 56 includes a spring clip 67, 68 formed with a pair of latching tabs 71, 72 that are received by narrow cutouts 69 near the ends of stylized housing web 35 and beyond the ends of casing 27. Each clip 67, 68 is provided with an elongated slot 73 to receive a tool, such as a screw driver, to pry holding tabs 71, 72 from notches 69 in order to decouple duct sections 21, 21. It is noted that the web at each end of stylized housing web 35 is notched back, as at 76, to provide clearance for the web portion of retainer 66.

It is noted that feed-in 24 has an internal construction consisting of contact assemblies that are modifications of contact assembly 60 altered to include wire grips (not shown). Stylized duct run 19 is shown in FIG. 1 as being suspended from ceiling 79 by rods 81. The leftmost rod 81 extends into central aperture 82 of hanger plate 83 (FIG. 12). Plate 83 is of generally U-shaped cross-section with very short arms 84, 85 that extend into complementary recesses in the arms of extruded channel stub 86. Bendable ears 87, 88 at each end of plate 83 prevent relative movement between members 83 and 86. Rivet 91 secures spring clamp hanger 90 to the lower surface of the web of channel stub 86 at the center thereof (FIG. 9). Clamp hanger 90 includes short outwardly and downwardly extending arms 98, 99 having inwardly facing hook formations along the free edges thereof. Arms 98, 99 are deflectable and fall behind longitudinally extending holding ribs formed on the exterior of stylized housing web 35. Each arm 98, 99 is provided with an ear 93 having an elongated notch 94 for the insertion of a tool to deflect the arms of hanger 19 and disengage them from holding ribs 92.

The three hanger rods 81 to the right of FIG. 1 are secured at their lower ends to individual plates 95, having opposite edges captured within slots in the arms of channel 96. The web of channel 96, on the lower surface thereof, supports a plurality of clamped hangers 90 which engage the holding ribs 92 of the stylized duct section 21. Normally, a stylized duct run will be suspended by a single type of hanger means rather than the different type of hanger means shown in FIG. 1.

As seen in FIGS. 1 and 13, the upper edges 101, 102 of stylized housing 25 extend above the outer edge portions of web 35 to provide ledges over which the flattened hooked upper edges 103 of hanger strips 105 extend. The main portion 104 of each hanger strip 105 is held by gravity against an outer side surface of stylized housing 25. The lower edge of each strip 105 is provided with an outwardly turned, longitudinally extending lip 106 that is flush with the lower surface of stylized housing 25. The upper surface of lip 106 is intended to support the edge of a ceiling tile or other element forming dropped ceiling 107 above which stylized duct run 19 is positioned.

It is noted that relative proportions of elements as shown in the drawing may not be suitable for commercial constructions. However, in a construction suitable for commercial application each stylized duct unit 20, 21 is four feet long and the overall cross-section is approximately a 1⅝ inches square.

Although there has been described a preferred embodiment of this novel invention, many variations and modifications will now be apparent to those skilled in the art. Therefore, this invention is to be limited, not by the specific disclosure herein, but only by the appending claims.

The embodiments of the invention in which an exclusive privilege or property is claimed are defined as follows.

1. Electrical distribution apparatus including an elongated electrical duct section constructed as a subassembly, an elongated decorative housing section wherein said duct section is disposed, said duct section and said housing section being substantially equal in length, and holding means to operatively retain said sections against unintentional movement relative to each other; said duct section including an elongated casing, a plurality of longitudinally extending generally flat elongated conductors within said casing and insulating means interposed between said casing and said conductors to insulate the latter from said casing and insulate each of said conductors for one another; said casing and said housing section each being of generally rectangular cross-section including spaced walls, a web connecting the walls at their first ends and inwardly extending lips along the other ends of said walls, said lips being spaced from each other to define a longitudinally extending slot through which appliances may be inserted into said casing; said slots of said casing and said housing section being generally aligned; and mounting formations along said lips of said housing section for the mechanical securement of appliances extending into said casing in operative engagement with at least one of said conductors.

2. Apparatus as set forth in claim 1 in which the casing is constructed of formed sheet metal and the holding means exerts a clamping force urging the casing against the housing section.

3. Apparatus as set forth in claim 2 in which said housing section is constructed of extruded material.

4. Apparatus as set forth in claim 1 in which the mounting formations along the different lips of said housing section are assymmetrical to maintain polarization between said duct section and an appliance electrically connected thereto.

5. Apparatus as set forth in claim 1 in which the housing section is provided with assymmetrical interior formations adjacent the walls thereof to maintain polarization between said duct sections and other duct sections connected end to end with said duct section.

6. Apparatus as set forth in claim 1 in which the web of the housing section is provided with spaced longitudinally extending rib formation for engagement by hanger connected means to suspend said apparatus from a ceiling.

7. Electrical distribution apparatus including an elongated electrical duct section, an elongated decorative housing section wherein said duct section is disposed, and holding means to operatively retain said sections against unintentional movement relative to each other; said duct section including an elongated casing and a plurality of longitudinally extending insulated elongated conductors within said casing; said casing and said housing section each being of generally rectangular cross-section including spaced walls, a web connecting the walls at their first ends and inwardly extending lips along the other ends of said walls, said lips being spaced from each other to define a longitudinally extending slot through which appliances may be inserted into said casing; said slots of said casing and said housing section being generally aligned; and mounting formations along said lips of said housing section for the mechanical securement of appliances extending into said casing in operative engagement with at least one of said conductors; said web of the housing section including a longitudinally extending interior locating rib and each lip of said housing section including a longitudinally extending interior locating rib; said holding means including pressure plate means interposed between the webs of said housing section and said casing; said pressure plate means having a plurality of ears cooperating with said interior locating rib of said web to position said duct within said housing section; said casing having formations along the lips thereof cooperating with the interior locating ribs of said lips to further position said duct within said housing section.

8. Electrical distribution apparatus including an elongated electrical duct section, an elongated decorative housing section wherein said duct section is disposed, and holding means to operatively retain said sections against unintentional movement relative to each other; said duct section including an elongated casing and a plurality of longitudinally extending insulated elongated conductors within said casing; said casing and said housing section each being of generally rectangular cross-section including spaced walls, a web connecting the walls at their first ends and inwardly extending lips along the other ends of said walls, said lips being spaced from each other to define a longitudinally extending slot through which appliances may be inserted into said casing; said slots of said casing and said housing section being generally aligned; and mounting formations along said lips of said housing section for the mechanical securement of appliances extending into said casing in operative engagement with at least one of said conductors; a hanger strip which in cross-section includes a body portion, a hook portion at one end of said body portion, and a lip portion at the other end of said body portion; said body portion positioned adjacent the exterior of one wall of said housing section; said hook portion engaging said one wall in the vicinity of the web of said housing section; said lip portion and said lips of said housing section being generally coplanar with said lip portion extending outboard of said one wall of said housing section in operative position to support part of a dropped ceiling.

9. Electrical distribution apparatus including an elongated electrical duct section, an elongated decorative housing section wherein said duct section is disposed, and holding means to operatively retain said sections against unintentional movement relative to each other; said duct section including an elongated casing and a plurality of longitudinally extending insulated elongated conductors within said casing; said casing and said housing section each being of generally rectangular cross-section including spaced walls, a web connecting the walls at their first ends and inwardly extending lips along the other ends of said walls, said lips being spaced from each other to define a longitudinally extending slot through which appliances may be inserted into said casing; said slots of said casing and said housing section being generally aligned; and mounting formations along said lips of said housing section for the mechanical securement of appliances extending into said casing in operative engagement with at least one of said conductors; a coupling at one end of said duct section; said coupling including a generally U-shaped support having spaced parallel arms connected by a base, a plurality of insulated connectors secured to said support intermediate the ends thereof and positioned therein; a spring retainer secured to the outside of said base and including latch tip means extending into notches in the web of said housing section from the outside thereof; said walls being interposed between the arms of said duct section, and said base being interposed between said webs; and said connectors being in friction engagement with conductors.

10. Apparatus as set forth in claim 9 in which the housing section assymmetrical interior formations adjacent the walls thereof to maintain polarization between said duct sections and other duct sections connected end to end with said duct section, said arms being unequal in length, said interior formations receive the arms and cooperate therewith to maintain polarizations between said duct and housing section.

11. Apparatus as set forth in claim 10 in which the conductors extend slightly beyond the ends of the casing and said conductors extend in the vicinity of the ends of said housing section.

12. Apparatus as set forth in claim 11 in which there is a coupling at one end of said duct section; said coupling including a generally U-shaped support having spaced parallel arms connected by a base, a plurality of insulated connectors secured to said support intermediate the ends thereof and positioned therein; a spring retainer secured to the outside of said base and including latch tip means extending into notches in the web of said housing section from the outside thereof; said walls being interposed between the arms of said duct section, and said base being interposed between said webs; and said connectors being in friction engagement with conductors; said conductors extending slightly beyond the ends of the casing and said conductors extending in the vicinity of the ends of said housing section; at least one end of said housing section web being notched back to provide clearance for the spring retainer.

\* \* \* \* \*